United States Patent Office 2,744,829
Patented May 8, 1956

2,744,829

TREATMENT OF LIQUID EGG WHITES

Bernard M. Shaffer, Chicago, Ill., assignor, by mesne assignments, to Benjamin R. Harris, Chicago, Ill.

No Drawing. Application July 8, 1950,
Serial No. 172,785

20 Claims. (Cl. 99—210)

My invention is directed to the preparation of new and useful dried egg white products which are characterized by improved properties particularly for use in the baking of cakes and especially cakes of the type which are high in sugar content, namely, those in which the sugar is at least equal to or greater than the amount of the flour.

Numerous processes have been heretofore suggested, in the patent and other literature, for the production of dried egg white products. Such procedures have had as their objects, among others, to obtain dried egg white products of satisfactory color, odor, whipping characteristics, keeping properties, utility for cake baking purposes, and the like. Natural egg whites contain a multiplicity of different protein materials having varying physical and chemical properties, and the treatment of said egg whites and the utilization of them in cake baking involve complex physico-chemical phenomena. These facts make difficult or impossible any attempts to predict the behavior of egg whites in any particular environment when said egg whites are subjected to certain processing treatments.

It is well recognized, for instance, that the drying of liquid egg whites in their natural condition produces a product which is objectionable from a number of standpoints including its reconstitution and whipping properties which suffer materially. Hence, it has been standard practice to subject liquid egg whites, prior to the drying step, to extended fermentation, ripening, or enzyme treatment. While such procedures result in products having certain definite advantages with regard to whipping properties and the like, they concomitantly introduce serious objections with respect to odor of the final product as well as in regard to other aspects. Prior fermentation processes are discussed, for example, in U. S. Patents Nos. 1,818,212; 1,818,214; 1,996,801; 2,056,082; 2,059,399; and 2,166,070, as well as in a number of other patents.

In an effort to obviate the disadvantages of fermentation or ripening procedures, it has been proposed to eliminate the same and resort, instead, to the treatment of the natural liquid egg whites with various non-toxic acids such as lactic acid, hydrochloric acid, and the like, under controlled conditions of pH, prior to the drying operation. Typical of such acid treatment processes are those disclosed in U. S. Patents Nos. 2,059,399; 2,168,926 and 2,189,380. In U. S. Patent No. 2,280,147, a combination acid addition-fermentation treatment is utilized, the acid first being added to the liquid egg whites and then the acidified liquid egg whites are subjected to fermentation, by the organisms present in the egg whites, the acid condition being utilized as a control of the fermentation.

My invention involves the subjection of liquid egg whites to a fermentation treatment, particularly a fermentation treatment and certain additional treatments, carried out under certain controlled conditions, coupled with the incorporation of glycerin into the fermented liquid egg whites in controlled amounts, after which the liquid egg whites are dried in any suitable manner, as, for example, by pan drying or spray drying procedures. The amount of glycerin added to the fermented liquid egg whites is such that the final dried egg white product, which is in the form of a powder or a granular product having a glassy or granular appearance depending upon the manner of drying, contains from about 4% to about 17%, and particularly from about 6% to about 10%, by weight, of glycerin. The final dried egg white product, in its preferred embodiments, is characterized by exceptionally satisfactory properties in relation to freedom from insolubles, practical sterility, odor, whip, sugar-carrying capacity, and freedom from discoloration on aging. It has excellent solubility in water and, when used in the baking of cakes, produces cakes of excellent texture, color and volume. The resulting cakes are, moreover, characterized by especially good color stability and volume retention on storage. Prepared cake mixes made with the dried egg white products of my invention have outstanding stability or shelf life in comparison with such cake mixes prepared with heretofore known dried egg white products.

It should be understood that I do not claim any patentable novelty in the broad concept of producing a liquid egg white product or a dried egg white product having a content of glycerin therein. Such products have heretofore been disclosed as is shown, for example, in such U. S. patents as Nos. 1,924,990 and 2,176,078, and such foreign patents as British Nos. 314,887 and 570,268. None of these patents nor any other publications of which I am aware discloses or suggests the production of a dried fermented egg white product, in the form of a powder or granular mass, containing glycerin in the range of about 4% to about 17%, by weight, and especially such a product wherein the fermentation and other treatment is effected in the manner described hereafter. None of the heretofore known egg white products, of the type shown in the patents mentioned in this paragraph is capable of achieving the results obtained by the use of the dried egg white products produced in accordance with my present invention when employed in the baking of cakes, notably high-sugar cakes.

While, in the broadest aspects of my invention, the fermentation of the liquid egg whites may be carried out in various ways heretofore known in the art, as shown, for example, in the patents cited in the earlier part of this specification, I find it to be especially desirable to effect the fermentation procedure by initially subjecting the liquid egg whites, which in the fresh condition have a pH in the range of about 9 or slightly below 9, to extended fermentation to effect ripening thereof. This fermentation is permitted to proceed, in general, until a pH of 6 is reached but it may be allowed to continue to as low as pH 5.5 or even pH 5.3. The denatured scum which forms is removed, the fermented liquid egg whites which undergo chemical and biological change due to the action of the micro-organisms, under initially alkaline and then progressively under neutral and finally acidic conditions, are then admixed with a non-toxic acid-reacting material to produce a pH in the range of about 4.8 to approximately 5.1 and the mixture is then preferably allowed to stand for a number of hours, whereupon a precipitate of previously dispersed fermented albumins forms and settles out. The supernatant liquid is then preferably centrifuged or filtered to clarify it. Glycerin is then added to the thus prepared fermented liquid egg whites in such amounts that, after the resulting product is dried, the dried egg white product contains from about 4% to about 17%, by weight, of glycerin. With respect to the fermentation treatment, it may be pointed out that, without the addition of culture, the fermentation and ripening to the aforesaid pH of 4.8 to approximately 5.1 may take as long as 96 hours or even longer at 70 degrees F. With the addition of strong cultures of desirable microorganisms, the fermentation and ripening time may be reduced to 48 hours or even less. The lower the temperature at which fermentation and ripening are conducted, other conditions remaining equal, the longer will be the time of fermentation and ripening.

Where the fermentation and additional treatment are carried out in the preferred manner described above, the egg white product obtained does not contain the denatured protein material which becomes insoluble as a result of the biochemical changes which occur during the alkaline, neutral and acid stages of the fermentation process and are subsequently removed. It also does not contain that portion of the protein material which has undergone fermentation and remained in solution but which subsequently becomes denatured upon the addition of the acid.

Another procedure which can be utilized advantageously is initially to acidify fresh liquid egg whites with lactic acid or other edible acid to a pH of about 7 and then ferment and ripen to a pH of about 5.9 to 5.3. During this period, the natural egg white proteins undergo biological changes due to the ripening process during the neutral and acid stages only. As a result of such changes in the neutral and acid stages only, a portion of the soluble proteins becomes precipitated and these are removed from the liquid. The liquid, which contains the soluble egg white proteins, is then acidified with an edible acid such as, for example, lactic acid, to produce a pH of 4.8 to 5.1, preferably 4.8 to 4.9, and stirred. An additional precipitation takes place of protein which was ripened and had undergone biochemical change but previously remained in solution. Said precipitate is removed, glycerin is added in the previously stated amounts, and then the resulting product is dried.

The following examples are illustrative of the practice of my invention but it will be understood that the invention is not to be construed as limited thereby, since various changes may be made within the scope of the novel teachings contained herein and without in any way departing from the principles of my invention.

Example I

To 20,000 pounds of fresh liquid egg whites, a culture of organisms contained in natural egg whites was added and the mixture was allowed to stand for 48 hours at 65 degrees F. at which time a pH of 5.6 was reached. The portion of the protein which became coagulated during the subjection of the egg whites to said extensive ripening during the alkaline and acid stages until the pH of 5.6 was reached was removed. To the remaining fermented liquid egg whites, 560 pounds of a 10% lactic acid solution was added, with constant stirring, and the pH of the resulting liquid was 4.8. Stirring was discontinued and the mixture was allowed to stand overnight. The precipitate which formed was separated from the liquid by centrifugal action. The pH of the liquid was 4.9, this change occurring possibly because of elimination of carbon dioxide or perhaps was due to certain biochemical changes. Thereupon 225 pounds of glycerin was added, with stirring, and the resulting mixture was dried in pans by passing air thereover at a temperature of 119 degrees F. or slightly higher but below the temperature of coagulation of the egg white.

Example II

To 3,000 pounds of liquid egg whites at a temperature of about 70 degrees F., a heavy culture of organisms present in natural egg whites was added and the liquid egg whites were then allowed to ferment without stirring at a temperature of about 70 degrees F. until the product had a pH of approximately 5.9. The time of fermentation was approximately 55 hours. When the fermentation was completed, the mass of ripened liquid egg whites was separated from the denatured scum which formed during the fermentation and the separated liquid egg whites were transferred to another kettle. Thereupon, 3% of a 10% lactic acid solution was added, with stirring, until a pH of 4.8 to 4.85 was reached and allowed to stand for 10 hours. A slight precipitate formed which settled out. The supernatant liquid was then centrifuged to clarify it, 35 pounds of glycerin was then added, with stirring, and the resulting product was then pan dried in the manner set forth in Example I.

It will be understood that the time and temperature of fermentation and ripening depend upon the nature of the original egg whites used, the degree of resistance to biochemical changes due to the presence of anti-biotic substances, types of organisms and enzymes present, and quantity of culture or the number of organisms present. As I have previously stated, the fermentation step per se can be carried out in any of the ways heretofore known in the art and the liquid egg whites, which may be freshly broken or thawed-out frozen products, may be subjected to any of the conventional treatments prior to fermentation as, for example, by the addition of sugars, acids, and the like. If desired, previously cultured egg whites containing a heavy inoculate of acid-producing organisms or other acid-producing cultures, for example, lactic-acid producing cultures, may be added to the liquid egg whites in order to facilitate the fermentation. In general, the time of fermentation may be varied from about 45 hours to about 100 hours depending upon the amount of organisms and enzymes present in the medium. The fermentation step can be carried out in several ways heretofore known in the prior art as disclosed, for example, in U. S. Patents Nos. 1,818,212; 1,818,214; 2,168,926 and 2,280,147.

While, in the illustrative examples set forth above, I have shown the use of lactic acid, it will be understood that other non-toxic acids or acid-reacting materials of organic or inorganic character can be utilized in place of lactic acid, typical examples of such being tartaric acid, sodium acid tartrate, citric acid, acetic acid, malic acid, gluconic acid, gluconolactone, sulfurous acid, sulfuric acid, hydrochloric acid, phosphoric acids, mono-sodium dihydrogen phosphate, and the like. The acid addition advantageously should be controlled so that the pH of the mixture after the acid addition is approximately 5 and, preferably, is in the range of about 4.8 to about 5.1. The addition of the acid, in this stage of the process, tends to reduce the insolubles in the final dried product and it would appear that this is accomplished through an inhibitory effect upon coagulation of egg proteins during the drying operation. The acid addition to the biologically reacted egg albumins also seems to bring about better protein dispersion. During the fermentation and ripening process in alkaline, neutral and acid media, but before the egg whites reach a pH of about 4.9 or 5, there is an enormous multiplication of organisms. When the thus ripened egg whites are subsequently treated with acid, such as lactic acid, for example, as described hereinabove, there is a considerable reduction of the micro-organisms in the finished product. After the addition of the acid-reacting material, a slight precipitate is usually formed after a number of hours. If desired, the acidified liquid mass may be allowed to stand at about 75 degrees F. to about 80 degrees F. to permit settling. After the precipitate has settled out, the supernatant liquid may then be removed after which the glycerin is added and the resulting product dried in any suitable manner. In many instances, the supernatant liquid is quite clear but, in any event, I prefer to subject the liquid to centrifugal clarification or filtration in order to remove the insoluble material.

In certain instances, it is advantageous to add an edible or innocuous alkaline ingredient to the dried egg white products of my present invention in order to increase the pH thereof, when dissolved in water, to about pH 7, in those cases where a dried egg white product of acid reaction may not be desired for a particular purpose. This may conveniently be done by admixing the dried, pulverulent egg white product with the requisite amount of such substances as sodium carbonate or sodium bicarbonate but particularly disodium hydrogen phosphate. Alternatively, although not preferred, the alkaline ingredient can be added to the treated liquid egg material and the latter then dried.

As I have pointed out previously, the dried egg white products of my present invention are of especial utility in cake baking and they find a most important use in prepared or dry cake mixes, particularly those wherein the sugar content is high as, for instance, approaching or exceeding the amount of the flour. A typical example of such a prepared cake mix is as follows, the stated percentages being by weight:

| | Percent |
|---|---|
| Cake flour | 43.4 |
| Baker's special sugar | 42.0 |
| Salt | 1.1 |
| Shortening ("high ratio" type) | 10.0 |
| Baking powder | 2.0 |
| Dried egg white [1] | 1.5 |

[1] Product made in accordance with present invention.

Tests made with prepared cake mixes, such as that of the above example, for shelf life have shown unusually satisfactory results in relation to the dried egg white constituent. Baking tests have also demonstrated exceptionally satisfactory results in relation to cake texture, color, volume and retention of volume and color on aging of the baked cakes.

What I claim as new and desire to protect by Letters Patent of the United States is:

1. In a method of preparing dried egg whites of improved properties and characteristics, particularly for use in the baking of cakes, the steps which comprise subjecting liquid egg whites to extended fermentation to effect ripening thereof progressively through alkaline, neutral and acid stages, separating the ripened liquid egg whites from the scum which is formed during the fermentation, admixing said ripened liquid egg whites with an amount of a non-toxic acid-reacting material until the mixture has a pH of about 4.8 to about 5.1, adding glycerin, and then drying the resulting mixture, the amount of added glycerin being such that the final dried egg white product contains from about 4% to about 17%, by weight, of glycerin.

2. The method of claim 1, which includes the step of admixing an edible alkaline-reacting salt with the dried egg white product to increase the pH thereof, when dissolved in water, to about pH 7.

3. In a method of preparing dried egg whites of improved properties and characteristics, particularly for use in the baking of cakes, the steps which comprise subjecting liquid egg whites to extended fermentation to effect ripening thereof progressively through the alkaline, neutral and acid stages, separating the ripened liquid egg whites from the scum which is formed during the fermentation, admixing said ripened liquid egg whites with an amount of a non-toxic acid-reacting material until the mixture has a pH of about 4.8 to about 5.1, separating the liquid from the precipitate which is formed, adding glycerin, and then drying the resulting mixture, the amount of added glycerin being such that the final dried egg white product contains from about 4% to about 17%, by weight, of glycerin.

4. The method of claim 3, which includes the step of admixing an edible alkaline-reacting salt with the dried egg white product to increase the pH thereof, when dissolved in water, to about pH 7.

5. In a method of preparing dried egg whites of improved properties and characteristics, particularly for use in the baking of cakes, the steps which comprise subjecting liquid egg whites to extended fermentation, in the presence of an added lactic acid producing culture, to effect ripening of said egg whites progressively through the alkaline, neutral and acid stages, separating the ripened liquid egg whites from the scum which is formed during the fermentation, admixing said ripened liquid egg whites with an amount of a non-toxic acid until the mixture has a pH of about 4.8 to about 5.1, adding glycerin, and then drying the resulting mixture, the amount of added glycerin being such that the final dried egg white product contains from about 4% to about 17%, by weight, of glycerin.

6. In a method of preparing dried egg whites of improved properties and characteristics, particularly for use in the baking of cakes, the steps which comprise subjecting liquid egg whites to extended fermentation in the presence of an added lactic acid producing culture to effect ripening of said egg whites progressively through the alkaline, neutral and acid stages until a pH of 6 to 5.6 is reached, separating the ripened liquid egg whites from the scum which is formed during the fermentation, admixing said ripened liquid egg whites with an amount of a non-toxic acid-reacting material until the mixture has a pH of about 4.8 to about 5.1, separating the liquid from the precipitate which is formed, adding glycerin, and then drying the resulting mixture, the amount of added glycerin being such that the final dried egg white product contains from about 6% to about 10%, by weight, of glycerin.

7. In a method of preparing dried egg whites of improved properties and characteristics, particularly for use in the baking of cakes, the steps which comprise subjecting liquid egg whites to extended fermentation in the presence of an added lactic acid producing culture to effect ripening of said egg whites progressively through the alkaline, neutral and acid stages until a pH of 6 to 5.3 is reached, separating the ripened liquid egg whites from the scum which is formed during the fermentation, admixing said ripened liquid egg whites with a non-toxic acid until the mixture has a pH of about 4.8 to about 5.1, separating the liquid from the precipitate which is formed, adding glycerin, and then drying the resulting mixture, the amount of added glycerin being such that the final dried egg white product contains from about 6% to about 10%, by weight, of glycerin.

8. In a method of preparing dried egg whites of improved properties and characteristics, particularly for use in the baking of cakes, the steps which comprise subjecting liquid egg whites to extended fermentation to effect ripening thereof progressively through alkaline, neutral and acid stages until a pH of 6 to 5.3 is reached, separating the ripened liquid egg whites from the scum and insolubles which are formed during the fermentation, admixing said ripened liquid egg whites with a non-toxic acid-reacting material until the mixture has a pH of about 4.8 to about 5.1, adding glycerin, and then drying the resulting mixture, the amount of added glycerin being such that the final dried egg white product contains from about 6% to about 10%, by weight, of glycerin.

9. In a method of preparing dried egg whites of improved properties and characteristics, particularly for use in the baking of cakes, the steps which comprise subjecting liquid egg whites to extended fermentation to effect ripening thereof progressively through alkaline, neutral and acid stages until a pH of 6 to 5.3 is reached, separating the ripened liquid egg whites from the scum and insolubles which are formed during the fermentation, admixing said ripened liquid egg whites with a non-toxic acid-reacting material until the mixture has a pH of about 4.8 to about 4.9, separating the liquid from the precipitate which is formed, adding glycerin, and then drying the resulting mixture, the amount of added glycerin being such that the final dried egg white product contains from about 6% to about 10%, by weight, of glycerin.

10. In a method of preparing dried egg whites of improved properties and characteristics, particularly for use in the baking of cakes, the steps which comprise adding a non-toxic acid-reacting material to liquid egg whites to produce a pH of about 7, subjecting said liquid egg whites to extended fermentation to effect ripening thereof until a pH in the range of 6 to 5.3 is reached, separating the ripened liquid egg whites from the insolubles which are formed during the fermentation, admixing said ripened liquid egg whites with an amount of a non-toxic acid-reacting material until the mixture has a pH of about 4.8 to about 5.1, adding glycerin, and then drying the resulting mixture, the amount of added glycerin being such that the final dried egg white product contains from about 4% to about 17%, by weight, of glycerin.

11. In a method of preparing dried egg whites of improved properties and characteristics, particularly for use in the baking of cakes, the steps which comprise adding a non-toxic acid-reacting material to liquid egg whites to produce a pH of about 7, subjecting said liquid egg whites to extended fermentation in the presence of an added lactic acid producing culture to effect ripening thereof until a pH in the range of 6 to 5.6 is reached, separating the ripened liquid egg whites from the insolubles which are formed during the fermentation, admixing said ripened liquid egg whites with an amount of a non-toxic acid-reacting material until the mixture has a pH of about 4.8 to about 5.1, separating the liquid from the precipitate which is formed, adding glycerin, and then drying the resulting mixture, the amount of added glycerin being such that the final dried egg white product contains from about 4% to about 17%, by weight, of glycerin.

12. In a method of preparing dried egg whites of improved properties and characteristics, particularly for use in the baking of cakes, the steps which comprise subjecting liquid egg whites, to which a non-toxic acid has been added to produce a pH not in excess of 7, to extended fermentation to effect ripening thereof until a pH in the range of 6 to 5.3 is reached, separating the ripened liquid egg whites from the insolubles which are formed during the fermentation, admixing said ripened liquid egg whites with an amount of a non-toxic acid until the mixture has a pH of about 4.8 to about 4.9, separating the liquid from the precipitate which is formed, adding glycerin, and then drying the resulting mixture, the amount of added glycerin being such that the final dried egg white product contains from about 6% to about 10%, by weight, of glycerin.

13. In a method of preparing dried egg whites of improved properties and characteristics, particularly for use in the baking of cakes, the steps which comprise subjecting liquid egg whites to extended fermentation to effect ripening thereof progressively through alkaline, neutral and acid stages, separating the ripened liquid egg whites from the scum which is formed during the fermentation, admixing said ripened liquid egg whites with an amount of a non-toxic acid-reacting material until the mixture has a pH above the iso-electric point of the biologically reacted and acidified egg proteins but not above 5.1, separating the liquid from the precipitate which is formed, adding glycerin, and then drying the resulting mixture, the amount of added glycerin being such that the final dried egg white product contains from about 4% to about 17%, by weight, of glycerin.

14. In a process of preparing dried egg whites of improved properties and characteristics, particularly in the baking of cakes, the steps which comprise subjecting liquid egg whites to fermentation to effect ripening thereof progressively through alkaline, neutral and acid stages, separating the ripened liquid egg whites from the scum which is formed during the fermentation, adding glycerin, and then drying the resulting mixture, the amount of added glycerin being such that the final dried egg white product contains from about 4% to about 17%, by weight, of glycerin.

15. The method of claim 14, which includes the step of admixing an edible alkaline-reacting salt with the dried egg white product to increase the pH thereof, when dissolved in water, to about pH 7.

16. In a process of preparing dried egg whites of improved properties and characteristics, particularly in the baking of cakes, the steps which comprise subjecting liquid egg whites to fermentation to effect ripening thereof, separating the ripened liquid egg whites from the scum which is formed during the fermentation, adding glycerin, and then drying the resulting mixture, the amount of added glycerin being such that the final dried egg white product contains from about 4% to about 17%, by weight, of glycerin.

17. The method of claim 16, which includes the step of admixing an edible alkaline-reacting salt with the dried egg white product to increase the pH thereof, when dissolved in water, to about pH 7.

18. In a process of preparing dried egg whites of improved properties and characteristics, particularly in the baking of cakes, the steps which comprise subjecting liquid egg whites to fermentation to effect ripening thereof, adding glycerin, and then drying the resulting mixture, the amount of added glycerin being such that the final dried egg white product contains from about 4% to about 17%, by weight, of glycerin.

19. The process of claim 18, which includes the step of admixing an edible alkaline-reacting salt with the fermented liquid egg white product to increase the pH thereof to about 7, and then drying said liquid egg white product.

20. The process of claim 18, which includes the step of admixing an edible alkaline-reacting salt with the dried egg white product to increase the pH thereof, when dissolved in water, to about pH 7.

References Cited in the file of this patent
UNITED STATES PATENTS

| | | |
|---|---|---|
| 1,639,549 | Bellamy | Aug. 16, 1927 |
| 1,996,801 | Fischer | Apr. 9, 1935 |
| 2,212,445 | Littlefield et al. | Aug. 20, 1940 |
| 2,280,147 | Fischer | Apr. 21, 1942 |
| 2,445,299 | Boggs et al. | July 13, 1948 |
| 2,465,875 | Hopkins | Mar. 29, 1949 |
| 2,630,387 | Epstein et al. | Mar. 3, 1953 |

FOREIGN PATENTS

| | | |
|---|---|---|
| 314,887 | Great Britain | July 2, 1929 |

OTHER REFERENCES

"The U. S. Egg and Poultry Magazine," May 1943, pages 224, 225, 230, 239, and 240, article entitled "Experimental preparation and preservation of glycerine egg yolk."